A. WALKER.
Gravel-Heaters.

No. 152,710.    Patented June 30, 1874.

Witnesses.
C. F. Brown
Melville Church

Inventor
A. Walker
by his Attys
Hall and Ellsworth

UNITED STATES PATENT OFFICE.

ALFRED WALKER, OF SING SING, NEW YORK.

IMPROVEMENT IN GRAVEL-HEATERS.

Specification forming part of Letters Patent No. 152,710, dated June 30, 1874; application filed January 21, 1874.

*To all whom it may concern:*

Be it known that I, ALFRED WALKER, of Sing Sing, in the county of Westchester and State of New York, have invented a new and Improved Heating and Drying Apparatus; and I do hereby declare the following to be a full, clear, and exact description of the same, reference being had to the accompanying drawings, forming part of this specification, in which—

Figure 1:
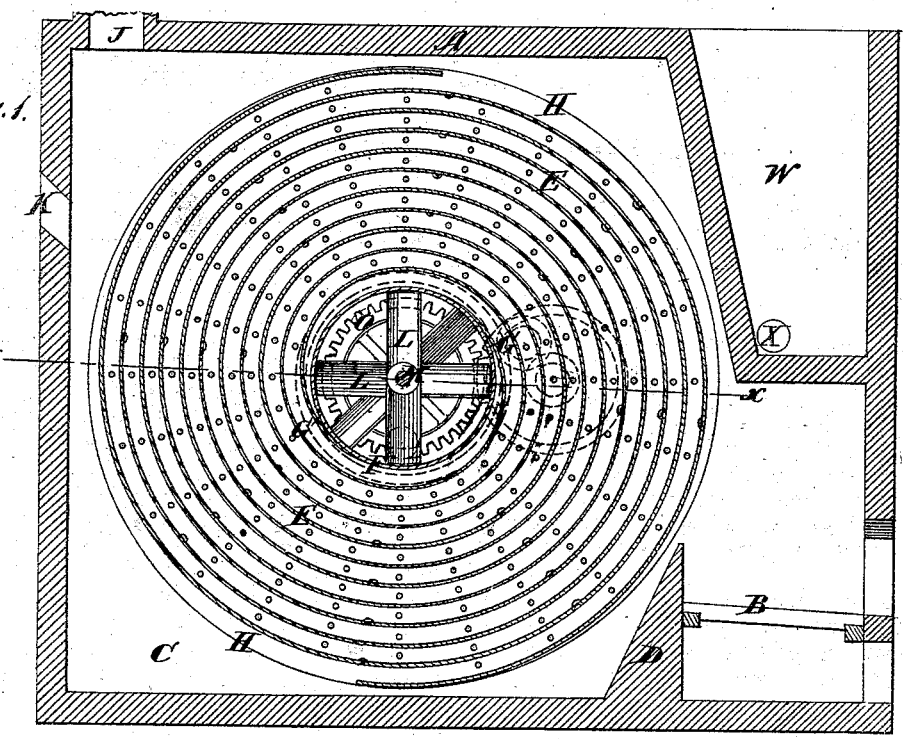
Figure 2:
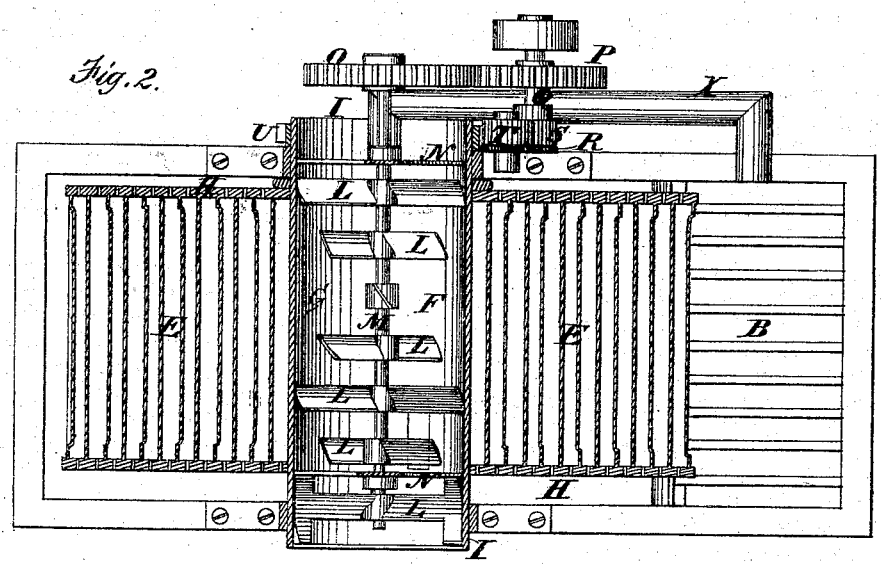

Figure 1 is a vertical longitudinal section of the apparatus; and Fig. 2 is a horizontal section taken in the line $x\ x$, Fig. 1.

Similar letters of reference in the accompanying drawings indicate the same parts.

My invention has for its object to produce an improved apparatus for heating and drying granular substances, such as sand, pulverized stone, earth, fine coal, or other minerals, preparatory to their incorporation with asphaltum, tar, or other material, for the formation of bricks, paving-blocks, artificial stone, and different varieties of concrete. The apparatus is also applicable to calcining plaster, drying grain, roasting coffee, &c.; but for convenience of description, I shall refer herein to its use in heating sand or pulverized minerals to mix with asphaltum for the production of building and paving materials.

The invention consists, first, in a revolving scroll or volute mounted within a suitable heating-chamber upon a horizontal cylinder as its center of motion, the inner end of the volute communicating with the interior of the cylinder, and its outer end with the heating-chamber. The substance to be heated is picked up by the outer end of the volute, and discharged into the cylinder after having passed through all the convolutions of the scroll. It is, therefore, subjected to the action of the heat, continuing throughout an extended area of heating-surface, and brought uniformly to the high temperature required for incorporation with the asphalt. It also consists in providing the revolving volute or scroll with perforated heads, through which hot air from the heating-furnace shall enter the different convolutions, and thereby increase the heating capacity of the apparatus. It also consists in adapting the cylinder for a mixing-chamber, within which the substance heated in the scroll is combined with any other substance, entering the end of the cylinder without passing through the scroll.

In the accompanying drawings, A is an oblong or rectangular heating-chamber, provided with a fire-grate, B, at one end, which is separated from the main chamber C by a bridge or wall, D, rising slightly above the back of the grate, to prevent the fuel and ashes from falling behind it. E is the volute or scroll, preferably formed of sheet metal, wound in the form of a spiral scroll or volute about a central hollow cylinder, F, with the interior of which the inner end of the scroll-passage communicates through one or more openings, G. H are the heads, secured to the scroll by through-bolts, and perforated at intervals radially to communicate with the scroll-passage, such perforations being made about midway between two coils or volutes of the sheet metal, to prevent the substance contained in the scroll from falling out through the perforations when the scroll is rotated. The ends of the cylinder F project beyond the heads of the scroll to form journals I for the latter, having their bearings in the sides of the heating-chamber, at such a height that the scroll shall revolve in close proximity to the floor of the main chamber, as shown.

The unusual diameter of the journals, together with the weight of the scroll, creates a large amount of friction upon the journal-bearings, and to relieve this friction, rollers are arranged in such bearings in any suitable manner.

The scroll is rotated by any convenient arrangement of gearing, connecting one of its journals with the desired motor, and its operation is as follows: A fire being started upon the grate B, the products of combustion and the heated air pass around upon all sides of the scroll, and escape through the chimney J at the rear of the main chamber. The scroll is then set in motion, and the substance to be treated is poured into the main chamber in any convenient manner, preferably through an opening, K, at the back, so as to fall in a small pile beneath the scroll in the path of its rotation.

As the mouth or outer opening of the scroll reaches the substance it picks up a certain quantity, which falls into the scroll-passage as the rotation continues, and passes throughout its entire length until discharged at its inner end through the opening G into the cylinder, from which it is taken for use, or mixed therein with other substances, as I will presently describe.

By this means the substance passes over an extended area of heating-surface, and is brought uniformly to a high or the desired degree of heat. The rotation of the scroll being moderate, the substance is thoroughly heated; and if it is a substance to be mixed with asphaltum or tar, for the formation of paving material, &c., its temperature is raised to such a degree as to render the process of mixing easy and the incorporation of the parts more complete. A certain proportion of heated air and products of combustion passes into the scroll through the perforations in its heads, as above described, and therefore increases the heating capacity of the apparatus. The heads, however, may be made imperforate, if desired.

L are the mixers or stirrers, mounted within the cylinder F upon a shaft, M, which extends longitudinally through said cylinder, and has its bearings in spiders N at the ends thereof. One end of this shaft, outside the cylinder, is provided with a gear-wheel, O, which engages with a corresponding gear-wheel, P, mounted upon a shaft, Q, having its bearings in a bracket, R, secured to the side of the furnace. The shaft next the bracket carries a pinion, S, which engages with a corresponding pinion, T, mounted upon the bracket, so as to mesh into a large toothed rim, U, on the end or journal of the cylinder, as shown.

Power being applied to the shaft Q, this arrangement of gearing causes the scrolls and cylinder to revolve in one direction, and the mixers or stirrers in the opposite direction, within the cylinder. When, therefore, any substance is poured or placed within the cylinder through the end thereof to be incorporated with the heated substance discharged from the scroll, the stirrers or mixers act with greater effect to mix and combine them, because they prevent the separate substances from being thrown outward and carried round with the cylinder by centrifugal force.

W is a chamber or kettle formed in the furnace, immediately over the fire-grate, for melting asphaltum or coal-tar, when the same is to be mixed with sand or powdered stone, &c., for making a concrete.

In the operation of mixing, the melted asphalt flows in a continuous stream from the kettle through a pipe, X, into the end of the cylinder, where it encounters the stream of heated mineral substance from the scroll. The two streams are united and mixed by the stirrers, as above described, and the compound thus formed is discharged from the opposite end of the cylinder, the stirrers being inclined to their shaft slightly to effect this action.

In some cases the cylinder and mixer-arms may be used without the scroll, the substances to be mixed being all poured into one end of the cylinder. We therefore propose to construct some mixing-machines with the cylinder and stirrers only.

Instead of passing the products of combustion out of the heating-chamber through the chimney, the latter may be closed up or dispensed with altogether, when the draft created by the rotation of the scroll will carry the products of combustion along the scroll-passage, and discharge them through the central cylinder.

The scroll may also be provided with two or more peripheral openings, for lifting the substances to be heated.

For screening grain, coal, or other materials, the mixer-arms may be removed, and a bolt of wire-cloth mounted upon the shaft M. The material discharged from the inner end of the scroll falls upon the bolt, through which the fine particles sift, and are discharged at the end, while the coarse particles fall into the passage between the bolt and cylinder, and are also discharged at the end into a separate conveyer.

In some cases the course of the material to be heated is changed, being fed into the cylinder and discharged at the periphery of the scroll, as will be readily understood.

Having thus described my invention, what I claim is—

1. A rotary scroll or volute heater, adapted to lift at its periphery the substance to be heated, convey it through the scroll or volute, and discharge it at the center, substantially as described.

2. The scroll or volute heater, combined with the central discharge and mixer-arms, substantially as described, for the purpose specified.

3. The scroll-heater provided with perforated heads, substantially as described, for the purpose specified.

4. The scroll-heater composed of sheet metal, wound in the form of a spiral scroll or volute about a central hollow cylinder, and provided with suitable heads, substantially as described.

5. The scroll having the central hollow cylinder extended beyond the heads to form journals, substantially as described.

6. The combination of the scroll or volute heater with a heating furnace and chamber, substantially as described, for the purpose specified.

7. The combination of the scroll or volute heater and the mixer with a heating furnace and chamber, substantially as described, for the purposes specified.

8. The heating chamber and furnace, constructed with a kettle or receptacle over the grate, communicating with the mixing-cylinder of the scroll-heater, substantially as described, for the purpose specified.

ALFRED WALKER.

Witnesses:
E. A. ELLSWORTH,
N. K. ELLSWORTH.